Patented Sept. 7, 1948

2,448,638

UNITED STATES PATENT OFFICE 2,448,638

HEAT-SEALING ADHESIVE TAPE

Thomas F. Murray, Jr., and George F. Sharrard, Rochester, N. Y., assignors to Eastman Kodak Company, Rochester, N. Y., a corporation of New Jersey No Drawing. Application October 1, 1943, Serial No. 504,640

4 Claims. (Cl. 117—122)

This invention relates to a heat-sealing composition and to a process for the preparation thereof.

It is known that melamine can be condensed with formaldehyde to give condensation products which, upon sufficient heating, give rise to insoluble polymerization products. It is further known that melamine can be condensed with formaldehyde, in the presence of hydroxylated compounds, to give condensation products which likewise can be hardened by the application of heat. Because these condensation products can be converted by heat into infusible and insoluble forms, they have been proposed as heat-sealing adhesives. Certain of these condensation products provide very useful heat-sealing adhesives for certain purposes, such as the lamination of wood. However, none of the condensation products known heretofore are fully satisfactory for the preparation of tapes wherein the heat-sealing composition is coated on a paper or cloth base and the resulting adhesive tape is then employed to join ends of paper, cloth or other material, by the application of heat to the tape, where the resulting seal is under some tension, such as would be caused by pulling the material which had been thus joined together, and/or where the resulting seal is soaked in aqueous media. Either the prior compositions were not thermoplastic enough to provide the necessary plastic flow when the heat was applied, or the resulting heat-converted form did not possess the strength to withstand the tension which might subsequently be applied to the seal, or to withstand soaking in aqueous media, or to withstand subsequent heating, or to withstand a combination of these conditions.

We have now found a new condensation product of melamine, formaldehyde and a partially hydrolyzed polyvinyl ester which possesses the necessary plastic flow and gives upon heating a very strong seal which withstands soaking in aqueous media. It is, accordingly, an object of our invention to provide a new heat-sealing composition and a process for the preparation thereof. A further object is to provide a tape comprising a base coated with such a new condensation product. A still further object is to provide a heat-sealed structure involving our new condensation product and a process for preparing it. Other objects will become apparent hereinafter.

In accordance with the invention, we prepare the new heat-sealing compositions by mixing melamine, formaldehyde and a partially hydrolyzed polyvinyl ester. Advantageously the melamine and formaldehyde are first mixed together, preferably in aqueous solution, and the resulting aqueous solution is then added to a solution of a partially hydrolyzed polyvinyl ester. A partially hydrolyzed polyvinyl acetate containing an acetate group content equivalent to from about 65 to about 90 per cent by weight of polyvinyl acetate is advantageously employed. A partially hydrolyzed polyvinyl acetate containing an acetate group content of from about 70 to about 80 per cent by weight is especially useful. The ratio of melamine to formaldehyde is advantageously 63 parts by weight of melamine to 120 parts by weight of 40 per cent aqueous formaldehyde, the ratio calculated to give trimethylol melamine. The weight of melamine advantageously is equivalent to from 8 to 20 per cent of the weight of partially hydrolyzed polyvinyl ester, and is preferably about 16 per cent.

Amides are advantageously added to the heat-sealing composition for the purpose of rendering the seal softer and more pliable. N,N-diethyl acetamide, N,N-dibutyl acetamide or formamide are exemplary of the amides which may be used as softeners. Glycol ethers, such as diethylene glycol diethyl ether, may also be used as softeners or plasticizers.

Solutions of our new heat-sealing compositions may be employed as mucilage or the solutions may be cast or coated on a support of paper, cloth or a sheet of regenerated cellulose and allowed to dry at moderate temperatures, e. g., no higher than 50° C. and preferably about between 15° and about 25° C. The resulting coated materials can be cut into strips or tapes of any desirable width.

To form a patch splice with a tape prepared in the above manner, the two ends of paper, cloth, regenerated cellulose sheeting or other material to be spliced are brought into proximity to each other above or below a piece of the tape and the splice is then heated under more or less pressure for a few seconds to a few minutes. We have found that an ordinary flat iron heated to about 200° C. applied by hand pressure to the splice for 30 seconds is capable of effecting a strong permanent seal. A pressure bar heated to about 135° C. may be substituted for the flat iron. Sealing is accomplished in 30 seconds with this sealing device. The above temperatures and times of heating are given only as illustrations. In general, outside of the above range, the higher the temperature used, the shorter is the time required to make the seal. Lap seals may be made by overlapping the two ends of the paper or other materials to be spliced, inserting between the surfaces a piece of adhesive film prepared from a solution of our new heat-sealing compositions, and then heating the splice. Such adhesive film can be prepared by casting a solution of our condensation product onto a surface to which it does not readily or permanently adhere, such as a polished surface of glass or metal. After drying the cast solution, the resulting film may be stripped from this non-adhering surface for subsequent use as an adhesive film. In another form of the heat-sealing lap joint, one or both of the overlapped surfaces to be joined can be coated with a solution of our new heat-sealing compositions and heated under pressure. Using any of the above techniques, we have spliced gelatin-coated paper, such as photographic paper containing a photographic gelatino - silver - halide emulsion on its surface, with both paper and cloth patches on both the gelatin coated and the uncoated surfaces of the paper. The splices were strong enough that, under tension, the paper would break before the splices broke. Moreover, the splices did not loosen even when the paper was put through processing solutions to develop the emulsion on its surface, nor during subsequent drying at 212° F., under tension. Furthermore, our heat-sealing compositions did not fog the photographic emulsion when applied in this manner.

The following examples will serve to illustrate the preparation of our new heat-sealing compositions.

Example 1.—To a solution of 24 cc. of 20 per cent formalin of pH 1, heated to 80° C., were added 6.3 g. of melamine. The resulting mixture was agitated until a solution was obtained. This solution was designated as solution A. Partially hydrolyzed polyvinyl acetate having an acetate group content equivalent to about 77.6 per cent by weight of polyvinyl acetate was dissolved to the extent of 20 g. in 100 cc. of an acetone-water mixture containing 650 cc. of acetone and 350 cc. of water. This solution was designated as solution B. Solution A was then added to solution B in various quantities to give various heat-sealing compositions. For example, 8 cc. of solution A was added to all of solution B to obtain a heat-sealing composition. A more rapid heat-sealing product was obtained by adding 16 cc. of solution A to all of solution B.

Example 2.—2250 g. of polyvinyl acetate (Gelva V-25) were dissolved in a mixture of 6800 cc. of absolute ethyl alcohol and 340 cc. of water. The resulting viscous solution was warmed to 70° C. and held at this temperature. To the heated solution at 70° C. was added a mixture of 34.5 cc. of 35 per cent hydrochloric acid diluted to 125 cc. with water. The resulting mixture was allowed to undergo hydrolysis at 70° C. for 22 hours. There was then added 30 g. of ammonium carbonate dissolved in 100 cc. of water. A sample of the hydrolysis mixture was precipitated in water, washed and dried. Analysis indicated that the precipitated partially hydrolyzed polyvinyl acetate containing an acetate group content equivalent to 74.6 per cent of polyvinyl acetate. This hydrolysis mixture was designated as solution C. A mixture of 60 cc. of 40 per cent aqueous formaldehyde of pH 7 and 60 cc. of water was warmed to 80° C. and 31.5 g. of melamine were added. The solution was maintained at about 80° C. until the solution was complete. This solution was designated as solution D. To 200 g. of solution C were added 26 cc. of solution D and the resulting solution was coated on paper to provide a heat-sealing tape.

Example 3.—To 200 g. of solution C (Example 2) were added 26 cc. of solution D (Example 2) and 3.3 g. of N,N-diethyl acetamide. The resulting solution was coated on paper to use as heat-sealing tape. The seals made with this tape were superior in some uses to those made with the tape from Example 2, in that the resultant splice was softer and more pliable and yet retained its useful adhesive properties.

Tapes prepared with heat-sealing compositions such as described in Examples 1, 2 or 3 can be used directly for heat-sealing, for only a short time after they are prepared. If they are stored for a considerable time under relatively dry conditions or at comparatively high temperatures they fail to heat-seal directly. For example, a tape stored at 120° F. in an atmosphere of 20 per cent relative humidity soon ceases to seal directly upon the application of heat. We have found that the activity of such a tape can be revived even after 300 hours under the above conditions, if the surface of the adhesive tape is moistened with water, with or without added surface-active agents such as Aerosol OT, and in our heat-sealing process, we prefer to moisten the surface of the tape in all cases before heat-sealing. The ease of uniformly moistening the adhesive is increased by the presence of a detergent in the adhesive coating. Heat-sealing compositions containing detergents can be prepared as illustrated in the following example.

Example 4.—To 200 g. of solution A (Example 2) were added 26 cc. of solution B (Example 2), 3.3 g. of N,N-diethyl acetamide and 0.33 g. of Aerosol OT (Dioctyl sodium sulfosuccinate, American Cyanamide and Chemical Corp.). The resulting solution was coated on paper to provide a heat-sealing tape. The resulting tape can be moistened much more readily and easily than the tapes of Examples 2 and 3, yet yields a thoroughly satisfactory and reliable splice.

Other detergents such as Triton 720 (an ether sulfonate), Triton K–60 (a tetra alkyl quaternary ammonium halide), both made by Rohn & Hass Co., Inc., Arctic Syntex A (Oleic acid ester of sulfonated aliphatic compound, Colgate-Palmolive-Peet Co.), Gardinol WA (Sulfate of lauryl alcohol, Colgate-Palmolive-Peet Co.), Duponol WA (Sulfate of lauryl alcohol, E. I. du Pont de Nemours and Co.), Orvus WA (Fatty alcohol sulfate, Procter and Gamble Co.), or Nekal BX (Sodium naphthalene sulfonate, General Dyestuff Corp.) can be substituted for Aerosol OT.

What we claim as our invention and desire to be secured by Letters Patent of the United States is:

1. A heat-sealing adhesive tape comprising a support coated with a condensation product prepared by mixing one molecular proportion of melamine with three molecular proportions of aqueous formaldehyde at pH 7 and a temperature of 80° C. and adding the resulting aqueous condensation product to an aqueous water soluble organic solvent solution of a partially hydrolyzed homopolymer of vinyl acetate containing an acetate group content equivalent to from 65 to 90 per cent by weight of homopolymeric vinyl acetate, the melamine constituting from 8 to 20 per cent by weight of the partially hydrolyzed homopolymeric vinyl acetate.

2. A heat-sealing adhesive tape comprising a support coated with a condensation product prepared by mixing one molecular proportion of melamine with three molecular proportions of aqueous formaldehyde at pH 7 and at a temperature of 80° C. and adding the resulting aqueous condensation product to an aqueous water soluble organic solvent solution of a partially hydrolyzed homopolymer of vinyl acetate containing an acetate group content equivalent to from 70 to 80 per cent by weight of homopolymeric vinyl acetate, the melamine constituting from 8 to 20 per cent by weight of the partially hydrolyzed homopolymeric vinyl acetate.

3. A heat-sealing adhesive tape comprising a support coated with a condensation product prepared by mixing one molecular proportion of melamine with three molecular proportions of aqueous formaldehyde at pH 7 and at a temperature of 80° C. and adding the resulting aqueous condensation product to an aqueous water soluble organic solvent solution of a partially hydrolyzed homopolymer of vinyl acetate containing an acetate group content equivalent to from 70 to 80 per cent by weight of the partially hydrolyzed homopolymeric vinyl acetate, the melamine constituting from 8 to 20 per cent by weight of homopolymeric vinyl acetate, the said condensation product containing a softener consisting of N,N-diethylacetamide.

4. A heat-sealing adhesive tape comprising a support coated with a condensation product prepared by mixing one molecular proportion of melamine with three molecular proportions of aqueous formaldehyde at pH 7 and at a temperature of 80° C. and adding the resulting aqueous condensation product to an aqueous water soluble organic solvent solution of a partially hydrolyzed homopolymer of vinyl acetate containing an acetate group content equivalent to from 70 to 80 per cent by weight of the partially hydrolyzed homopolymeric vinyl acetate, the melamine constituting from 8 to 20 per cent by weight of homopolymeric vinyl acetate, the said condensation product containing a softener consisting of N,N-diethylacetamide and a detergent selected from the group consisting of cation-active and anion-active wetting agents.

THOMAS F. MURRAY, JR.
GEORGE F. SHARRARD.

REFERENCES CITED

The following references are of record in the file of this patent:

UNITED STATES PATENTS

| Number | Name | Date |
|---|---|---|
| 812,384 | Thoma | Feb. 13, 1906 |
| 853,326 | Thoma | May 14, 1907 |
| Re. 20,430 | Morrison | June 29, 1937 |
| 2,138,578 | Hershberger | Nov. 29, 1938 |
| 2,188,329 | Bauer | Jan. 30, 1940 |
| 2,197,357 | Widmer | Apr. 16, 1940 |
| 2,213,763 | Gordon | Sept. 3, 1940 |
| 2,294,873 | D'Alelio | Sept. 1, 1942 |
| 2,322,888 | Schwartz | June 29, 1943 |
| 2,326,698 | Swain | Aug. 10, 1943 |
| 2,332,897 | D'Alelio | Oct. 26, 1943 |
| 2,338,252 | Marberg | Jan. 4, 1944 |
| 2,341,398 | Strother | Feb. 8, 1944 |
| 2,363,297 | D'Alelio | Nov. 21, 1944 |
| 2,376,511 | Saunders | May 22, 1945 |
| 2,396,098 | Haas | Mar. 5, 1946 |

OTHER REFERENCES

Du Pont, Technical Data Bulletin No. 3-243 (Molding Polyvinyl Alcohol), pages 1 and 2, February 1943.

Carbide and Carbon Chem. Corp., Vinylite Polyvinyl Acetate Resins, 1942, pp. 17 and 18.